United States Patent
Isobe et al.

(10) Patent No.: US 8,559,897 B2
(45) Date of Patent: Oct. 15, 2013

(54) INFORMATION PROCESSING APPARATUS AND RADIO WAVE INTENSITY CONTROL METHOD

(75) Inventors: Yasuhiko Isobe, Inagi (JP); Michihiro Konishi, Sagamihara (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 13/447,422

(22) Filed: Apr. 16, 2012

(65) Prior Publication Data

US 2012/0276861 A1 Nov. 1, 2012

(30) Foreign Application Priority Data

Apr. 28, 2011 (JP) ................................ 2011-100395

(51) Int. Cl.
*H01Q 11/12* (2006.01)
*H04B 1/04* (2006.01)

(52) U.S. Cl.
USPC ........................................ 455/117; 455/127.2

(58) Field of Classification Search
USPC ................. 455/575.7, 115.1, 117, 127.2, 129
See application file for complete search history.

(56) References Cited

U.S. PATENT DOCUMENTS

| | | | |
|---|---|---|---|
| 2004/0235541 A1* | 11/2004 | Iwai et al. | 455/575.7 |
| 2010/0279751 A1* | 11/2010 | Pourseyed et al. | 455/575.7 |
| 2012/0142393 A1* | 6/2012 | Won et al. | 455/522 |
| 2013/0137487 A1* | 5/2013 | Sato | 455/566 |

FOREIGN PATENT DOCUMENTS

| | | |
|---|---|---|
| JP | 2008-090345 | 4/2008 |
| JP | 2009-152705 | 7/2009 |
| JP | 2009-232437 | 10/2009 |
| JP | 2010-145837 | 7/2010 |

OTHER PUBLICATIONS

Korean Office Action mailed Jun. 24, 2013 for corresponding Korean Application No. 10-2012-0041285, with English-language translation.

* cited by examiner

*Primary Examiner* — Nguyen Vo
(74) *Attorney, Agent, or Firm* — Fujitsu Patent Center

(57) ABSTRACT

An information processing apparatus has radio communication function. A tilt detection unit detects a tilt of the information processing apparatus. An output changing unit changes an output of radio waves from an antenna for radio communication. Based on a detection result through the tilt detection unit, when a tilt θ of a predetermined external surface of a chassis of the information processing apparatus to a horizontal surface H is a predetermined angle or less, an output controller reduces an output of radio waves from the antenna to a predetermined value or less with respect to the output changing unit.

9 Claims, 15 Drawing Sheets

FIG. 12

AT THE TIME OF USING STATE C1 ($\theta$th1=30, $\theta$th2=15)

| $\theta$1 | | DISPLAY DIRECTION | LEVEL DETECTION | RADIO WAVE INTENSITY |
|---|---|---|---|---|
| SIDE SURFACE (SD2) OF THE FRONT SIDE IS TAKEN UP | 30 | C1 | No | STRONG |
| | 15 | C1 | No | STRONG |
| | | C1 | Yes | WEAK |
| | 0 | | | |
| SIDE SURFACE (SD1) OF THE NEAR SIDE IS TAKEN UP | -15 | C1 | Yes | WEAK |
| | | C1 | No | STRONG |
| | -30 | C2 | No | WEAK |

FIG. 13

AT THE TIME OF USING STATE C2 ($\theta th1=30, \theta th2=15$)

| $\theta 1$ | | DISPLAY DIRECTION | LEVEL DETECTION | RADIO WAVE INTENSITY |
|---|---|---|---|---|
| SIDE SURFACE (SD1) OF THE FRONT SIDE IS TAKEN UP | −30 | C2 | No | WEAK |
| | −15 | C2 | No | WEAK |
| | | C2 | Yes | WEAK |
| | 0 | | | |
| SIDE SURFACE (SD2) OF THE NEAR SIDE IS TAKEN UP | 15 | C2 | Yes | WEAK |
| | | C2 | No | WEAK |
| | 30 | C1 | No | STRONG |

FIG. 14

AT THE TIME OF USING STATE C1 ($\theta$ th1=15, $\theta$ th2=15)

| $\theta$ 1 | | DISPLAY DIRECTION | LEVEL DETECTION | RADIO WAVE INTENSITY |
|---|---|---|---|---|
| SIDE SURFACE (SD2) OF THE FRONT SIDE IS TAKEN UP | 30 | C1 | No | STRONG |
| | 15 | C1 | No | STRONG |
| | | C1 | Yes | WEAK |
| | 0 | C1 | Yes | WEAK |
| SIDE SURFACE (SD1) OF THE NEAR SIDE IS TAKEN UP | -15 | C2 | No | WEAK |
| | -30 | C2 | No | WEAK |

FIG. 15

AT THE TIME OF USING STATE C2 ($\theta$ th1=15, $\theta$ th2=15)

| | $\theta$ 1 | DISPLAY DIRECTION | LEVEL DETECTION | RADIO WAVE INTENSITY |
|---|---|---|---|---|
| SIDE SURFACE (SD1) OF THE FRONT SIDE IS TAKEN UP | −30 | C2 | No | WEAK |
| | −15 | C2 | No | WEAK |
| | 0 | C2 | Yes | WEAK |
| | 15 | C2 | Yes | WEAK |
| SIDE SURFACE (SD2) OF THE NEAR SIDE IS TAKEN UP | 30 | C1 | No | STRONG |
| | | C1 | No | STRONG |

INFORMATION PROCESSING APPARATUS AND RADIO WAVE INTENSITY CONTROL METHOD

CROSS-REFERENCE TO RELATED APPLICATION

This application is based upon and claims the benefit of priority of the prior Japanese Patent Application No. 2011-100395, filed on Apr. 28, 2011, the entire contents of which are incorporated herein by reference.

FIELD

The embodiment discussed herein is related to an information processing apparatus, a radio wave intensity control method, and a program.

BACKGROUND

As a unit for evaluating an influence of radio waves transmitted from a radio device such as a mobile phone, an SAR (Specific Absorption Rate) is used. The SAR indicates the amount of energy absorbed in a unit of time with respect to a tissue per unit mass of a human body exposed to radio waves. In Japan, based on a guideline indicated by WHO (World Health Organization), "a local SAR fails to exceed an allowed value of 2 W/kg" with regard to portable devices is obliged by an Ordinance of the Ministry of Internal Affairs and Communications.

Therefore, some portable information processing devices such as a mobile phone and a notebook PC (Personal Computer) stop an output of radio waves from an antenna, or reduce its output when detecting that their own devices each come close to a human body. For example, based on detection results of a display direction of a screen, when detecting that antennas come close to users, some tablet PCs stop an output of radio waves from the antennas. Some tablet PCs further detect a display direction of a screen by using a tilt sensor.

Japanese Laid-open Patent Publication No. 2008-90345
Japanese Laid-open Patent Publication No. 2009-152705

Incidentally, nations slightly differ from each other in interpretations of a standard of SAR. For example, as an object for restricting the SAR, there are some nations in which knees or thighs are included, and the other nations in which they are not included. In the case where knees or thighs are included as an object for restricting the SAR, for example, when an information processing device is mounted and used on knees in the seated state, radiated waves to a vertically downward direction of the information processing device need to be restricted.

In a notebook PC on which an antenna is mounted near a chassis of a display unit, even when it is mounted and used on user's knees, the antenna may be sufficiently separated from the user's knees or thighs so as to satisfy a standard of the SAR. Suppose further that a so-called convertible PC is mounted on user's knees, which is used as both of a notebook PC mode and a tablet PC mode. Even in this case, when a PC main body or display unit has a certain degree of thickness, an antenna in the tablet PC mode may be separated from the user's knees or thighs.

However, since thinning of a convertible PC advances recently, an antenna fails to be sufficiently separated from user's knees or thighs, and as a result a standard of the SAR is not satisfied. In this respect, much the same is true on a slate information processing device. Although not limited to the above devices, the thinning is demanded in various information processing devices. In a thinned information processing device, even if mounted in an internal portion or on a top side of the device, an antenna fails to be sufficiently separated from user's knees or thighs located in a vertically downward side.

SUMMARY

According to one aspect of the present invention, there is provided an information processing apparatus having radio communication function. This information processing apparatus includes a tilt detector configured to detect a tilt of the information processing apparatus; an output changer configured to change an output of radio waves from an antenna for radio communication; and an output controller configured to reduce an output of radio waves from the antenna to a predetermined value or less with respect to the output changer when it is determined based on a detection result obtained by the tilt detector that a tilt of a predetermined external surface of a chassis of the information processing apparatus to a horizontal surface is a predetermined angle or less.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 12 illustrates a relationship among a tilt of an information processing apparatus, a display direction of an image, and intensity of radio waves (part one);

FIG. 13 illustrates a relationship among a tilt of an information processing apparatus, a display direction of an image, and intensity of radio waves (part two);

FIG. 14 illustrates a relationship among a tilt of an information processing apparatus, a display direction of an image, and intensity of radio waves (part three); and FIG. 15 illustrates a relationship among a tilt of an information processing apparatus, a display direction of an image, and intensity of radio waves (part four).

DESCRIPTION OF EMBODIMENTS

Figure 1:
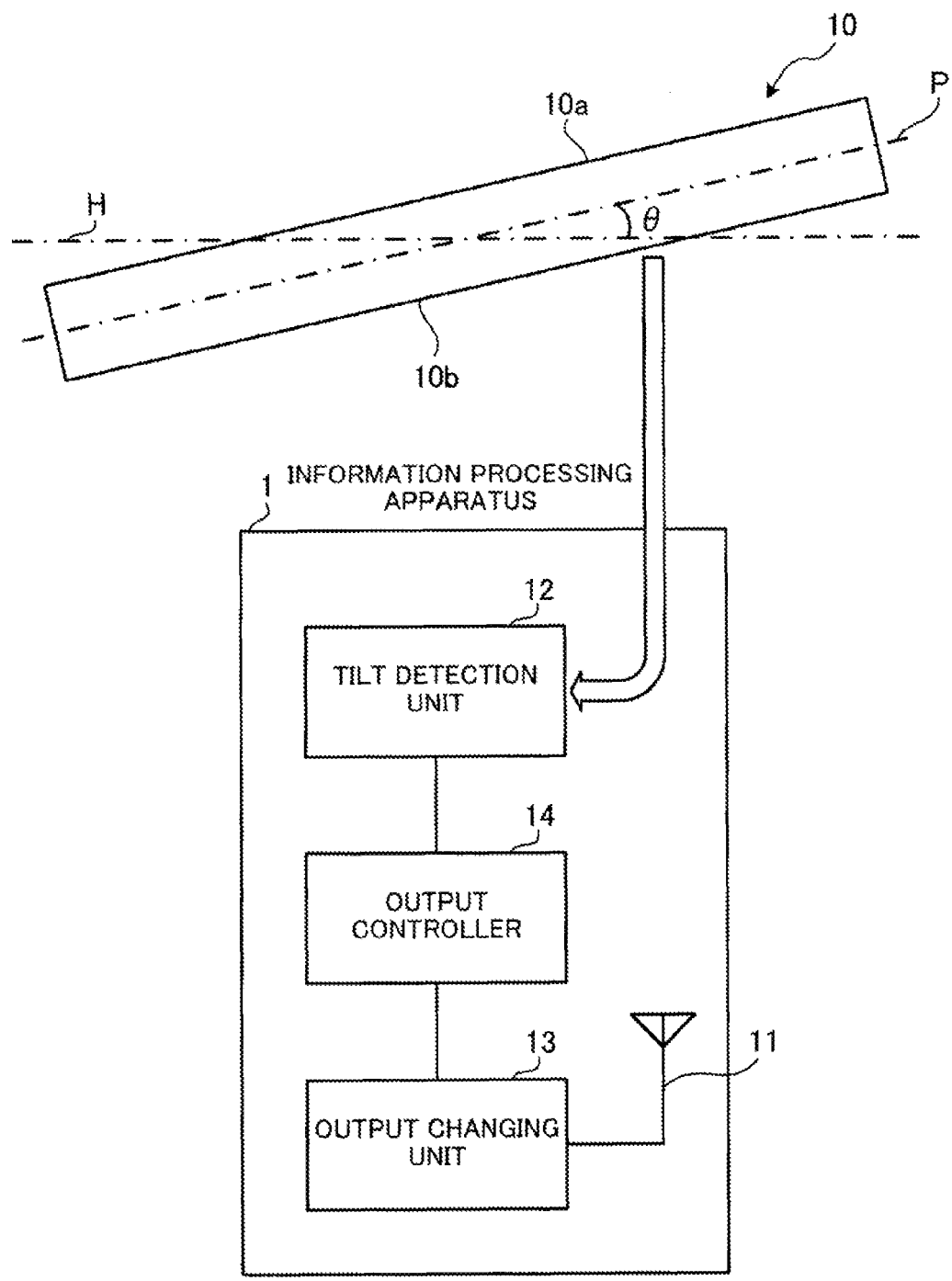
FIG. 1 illustrates a configuration example of an information processing apparatus according to a first embodiment.

Preferred embodiments of the present invention will now be described in detail below with reference to the accompanying drawings, wherein like reference numerals refer to like elements throughout.

First Embodiment

FIG. 1 illustrates a configuration example of an information processing apparatus according to a first embodiment.

The information processing apparatus 1 illustrated in FIG. 1 has radio communication function. In an internal part or on an external surface of a chassis of the information processing apparatus 1, an antenna 11 which transmits and receives radio signals at the time of radio communication is provided. The information processing apparatus 1 further includes a tilt detection unit 12, an output changing unit 13, and an output controller 14.

The tilt detection unit 12 detects a tilt of the information processing apparatus 1. The tilt detection unit 12 detects at least an angle between a predetermined surface of the chassis of the information processing apparatus 1 and a horizontal surface.

The output changing unit 13 changes intensity of radio waves radiated from the antenna 11 under the control of the output controller 14. The output controller 14 controls operations of the output changing unit 13 based on detection results from the tilt detection unit 12. In the case where a tilt of the above-described reference plane to the horizontal surface is a predetermined angle θth or less, for example, the output controller 14 controls the output changing unit 13 to reduce the intensity of radio waves radiated from the antenna 11 to a predetermined intensity or less. "A tilt of the reference plane to the horizontal surface is θth or less" is that an absolute value of an angle between the reference plane and the horizontal surface is equal to or smaller than θth.

On the top side of FIG. 1, one example of a cross-sectional surface of the chassis of the information processing apparatus 1 is here illustrated. In an example of FIG. 1, the chassis 10 of the information processing apparatus 1 has an approximately flat plate-shaped contour. In FIG. 1, two main surfaces (surfaces perpendicular to a thickness direction) of the approximately flat plate-shaped chassis 10 are supposed to be referred to as a top surface 10a and a bottom surface 10b for descriptive purposes. The top surface 10a is approximately parallel to the bottom surface 10b. A cross-sectional diagram illustrated in FIG. 1 indicates a cross-sectional surface of the chassis 10 viewed from a direction parallel to the top surface 10a and the bottom surface 10b of the chassis 10. Suppose further that the reference plane P is parallel to the bottom surface 10b.

On the top surface 10a, for example, a mechanism faced to a face side of a user at the time of normally using the information processing apparatus 1 such as a display unit of images and an input unit which receives an input operation through the user is provided. In the above-described case, the information processing apparatus 1 detects that a tilt of the reference plane P to the horizontal surface H is θth or less (namely, an absolute value of the angle θ between the reference plane P and the horizontal surface H is equal to or smaller than θth), thus estimating that its own apparatus is mounted on knees or thighs in a state where the user is seated. When the information processing apparatus 1 is mounted and used on the user's knees or thighs, the bottom surface 10b of the information processing apparatus 1 contacts with the user's knees or thighs, and as a result the antenna 11 comes close to the user's knees or thighs.

As compared with the above, when a tilt of the reference plane P to the horizontal surface H is θth or less, the output controller 14 controls the output changing unit 13 to reduce intensity of radio waves radiated from the antenna 11. Through the above processing, the output controller 14 controls the output changing unit 13 to reduce the intensity of radio waves radiated to a user's body close to the antenna 11 in a vertically downward direction. Particularly, when the information processing apparatus 1 is mounted on the user's knees or thighs, as a thickness of the chassis 10 is thinner, a distance between the antenna 11 and user's knees or thighs is shorter. As can be seen from the above discussion, also in the case where the chassis 10 is thinned, the intensity of radio waves radiated to the user's knees or thighs is reduced under the control of the output controller 14 and, for example, a local SAR with respect to the user's knees or thighs is equal to or smaller than a reference value.

Note that in the chassis 10, the reference plane P is preferably parallel to a surface (in FIG. 1, the bottom surface 10b) facing to a surface on which the display unit and the input unit are provided. The first embodiment makes it possible to correctly estimate a distance between the information processing apparatus 1 and user's knees or thighs.

When absolute values of angles between straight lines in all directions along the reference plane P and the horizontal surface H are equal to or smaller than θth, the output controller 14 preferably controls the intensity of radio waves radiated from the antenna 11 to predetermined intensity or less. As one example where the above-described control is possible, both of absolute values of angles between two straight lines perpendicular to each other along the reference plane P and the horizontal surface H are supposed to be equal to or smaller than θth. In this case, the output controller 14 may control the intensity of radio waves radiated from the antenna 11 to the predetermined intensity or less.

The chassis 10 illustrated in FIG. 1 may be further a part of a configuration of the information processing apparatus 1. For example, a notebook PC generally has a configuration in which a first chassis including a keyboard and a second chassis including a display unit are connected via a hinge. In the above-described case, the chassis 10 illustrated in FIG. 1 may be set as the first chassis including a keyboard. Accordingly, in the case where the antenna 11 is provided in the first chassis or on an external surface thereof, the first embodiment makes it possible to reduce the intensity of radio waves radiated to user's knees or thighs close to this antenna 11.

Second Embodiment

Figure 2:
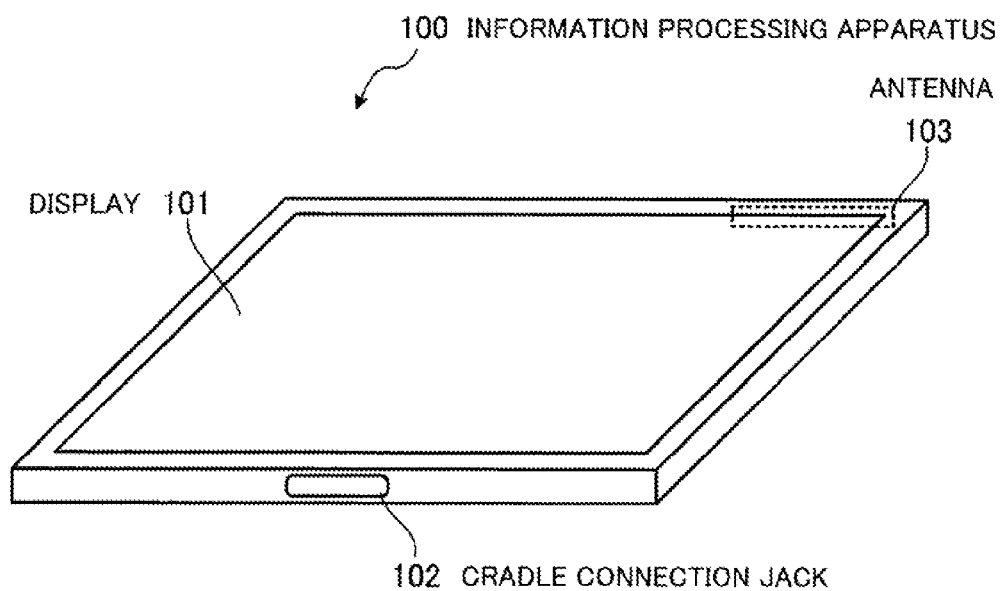
FIG. 2 illustrates an example of a contour of an information processing apparatus according to a second embodiment.

As an example of the information processing apparatus, a slate information processing apparatus will be described below. FIG. 2 illustrates an example of a contour of the information processing apparatus according to a second embodiment.

Examples of the information processing apparatus 100 illustrated in FIG. 2 include a portable PC for a user. The information processing apparatus 100 is driven by a power supply from a built-in battery. A chassis of the information processing apparatus 100 has an approximately flat plate shape, and a touch panel display 101 is provided on one surface of the chassis. A cradle connection jack 102 is further provided on one of side surfaces contacted with a mounting surface of the display 101 of the chassis. Into the cradle connection jack 102, a connector provided on the after-mentioned cradle is inserted.

The information processing apparatus 100 further has radio communication function. The information processing apparatus 100 performs radio communication, for example, via a wide area radio communication line network of 3G (3rd Generation) mobile phone. The information processing apparatus 100 includes an antenna 103 for performing radio communication in an internal part or on an external surface of a chassis. In an example of FIG. 2, the antenna 103 is provided in a position close to an outer edge part of an approximately flat plate-shaped chassis.

Figure 3:
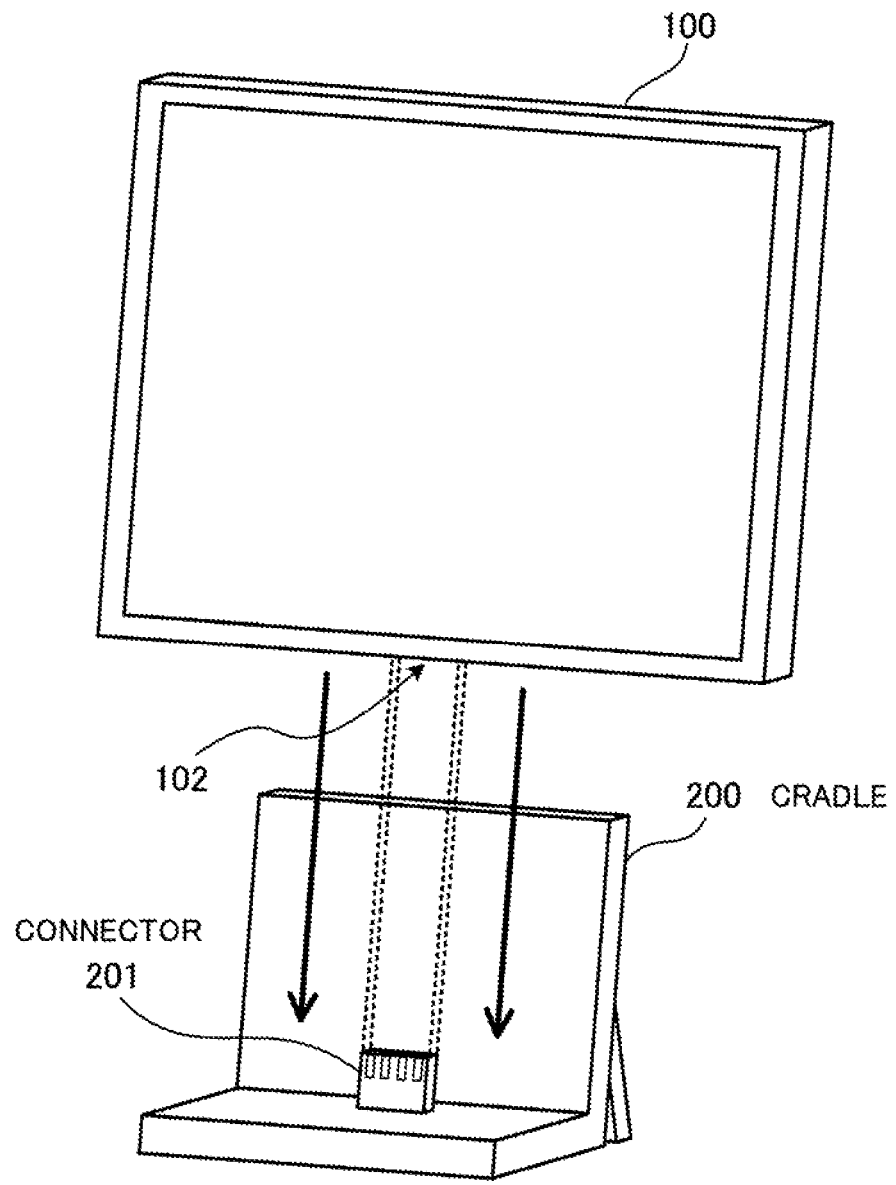
FIG. 3 illustrates an example of a contour of a cradle.
Figure 4:
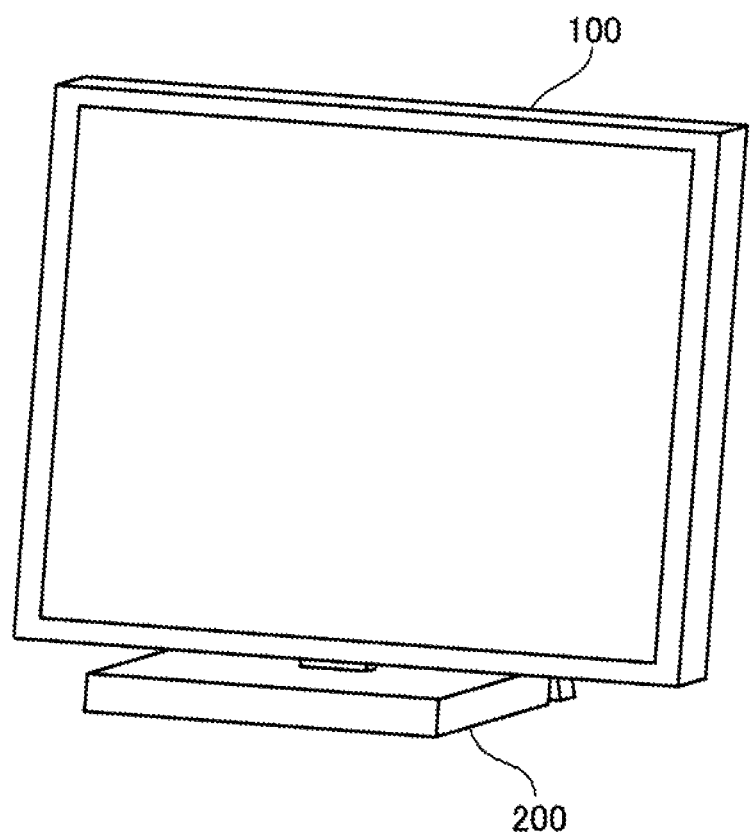
FIG. 4 illustrates a state where an information processing apparatus and a cradle are connected to each other.

FIG. 3 illustrates an example of a contour of the cradle. In FIG. 3, along with the cradle, the information processing apparatus connected to this cradle is also illustrated. FIG. 4 further illustrates a state where the information processing apparatus is connected to the cradle.

On the cradle 200, the connector 201 for connecting to the information processing apparatus 100 is provided. When the connector 201 of the cradle 200 is inserted into the cradle connection jack 102 provided on the information processing apparatus 100, the information processing apparatus 100 is connected to the cradle 200 in a state where its own apparatus stands erect, as illustrated in FIG. 4. In addition, to the cradle 200, for example, an AC (Alternating Current) adapter is connected. The information processing apparatus 100 connected to the cradle 200 receives direct-current power AC/DC (Direct Current) converted by an AC adapter from the cradle 200 via the connector 201, thereby driving its own apparatus by using the power.

Figure 5:
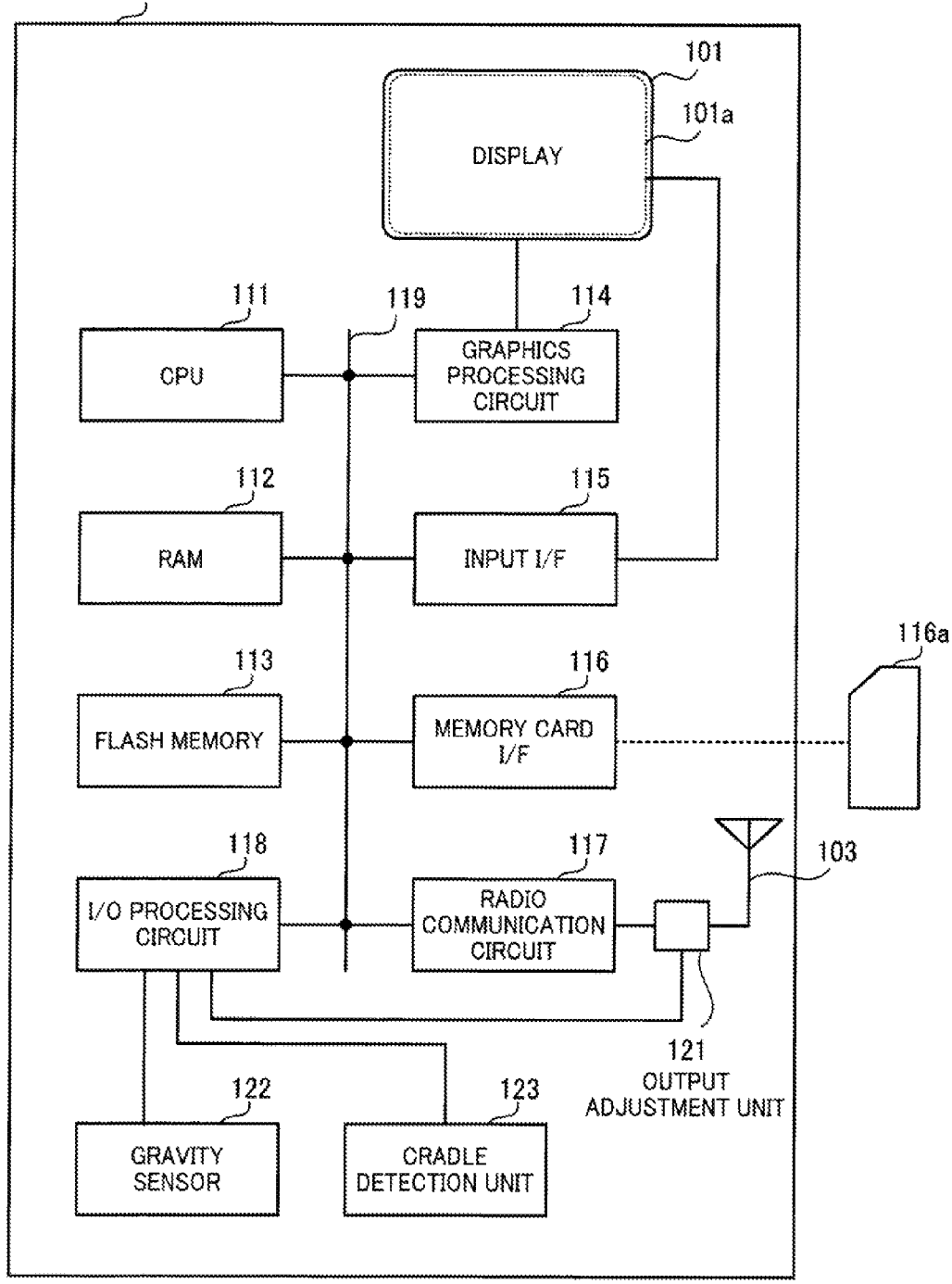
FIG. 5 illustrates a hardware configuration example of an information processing apparatus.

FIG. 5 illustrates a hardware configuration example of the information processing apparatus.

The whole information processing apparatus 100 is controlled by a CPU (Central Processing Unit) 111. To the CPU 111, a RAM (Random Access Memory) 112 and a plurality of peripheral devices are connected via a bus 119.

The RAM 112 is used as a main storage device of the information processing apparatus 100. In the RAM 112, at least a part of an OS (Operating System) program or application program executed by the CPU 111 is temporarily stored. In addition, in the RAM 112, various data necessary for a processing executed by the CPU 111 is stored.

Examples of the peripheral devices connected to the bus 119 include a flash memory 113, a graphics processing circuit 114, an input I/F (Interface) 115, a memory card interface 116, a radio communication circuit 117, and an I/O (In/Out) processing circuit 118.

The flash memory 113 is used as a secondary storage device of the information processing apparatus 100. In the flash memory 113, an OS program, application program, and various data are stored. As the secondary storage device, other types of nonvolatile memory devices such as an HDD (Hard Disk Drive) may be used.

To the graphics processing circuit 114, the display 101 is connected. The graphics processing circuit 114 displays an image on the display 101 according to a command from the CPU 111.

To the input I/F 115, a touch panel 101a provided on a display surface of the display 101 is connected as an input device. The input I/F 115 supplies an output signal from the touch panel 101a to the CPU 111.

To the memory card interface 116, a memory card 116a being a portable storage device using a flash memory as a storage device is connected. The memory card interface 116 supplies data read out from the memory card 116a to the CPU 111. In the memory card 116a, the memory card interface 116 further writes data, writing of which is requested from the CPU 111.

The radio communication circuit 117 performs radio communication via the wide area radio communication line network of the 3G mobile phone. To the radio communication circuit 117, the antenna 103 is connected via the output adjustment unit 121, and the radio communication circuit 117 transmits and receives radio waves by using the antenna 103. The output adjustment unit 121 controls a voltage produced from the radio communication circuit 117 to the antenna 103, thus changing the intensity of radio waves radiated from the antenna 103. Note that the radio communication circuit 117 may be a circuit for performing radio communication via the wide area radio communication line network by using other methods such as WiMAX (Worldwide Interoperability for Microwave Access).

The I/O processing circuit 118 is a circuit so as to transmit and receive information between the CPU 111 and the other devices. To the I/O processing circuit 118, the output adjustment unit 121, a gravity sensor 122, and a cradle detection unit 123 are connected.

The I/O processing circuit 118 controls the output adjustment unit 121 to change the intensity of radio waves radiated from the antenna 103 according to a request from the CPU 111.

The gravity sensor 122 is a sensor which detects a tilt of the information processing apparatus 100, and has, for example, a sensor which detects gravity acceleration with respect to two or more axial directions. The I/O processing circuit 118 supplies tilt detection results through the gravity sensor 122 to the CPU 111. Examples of the sensor which detects a tilt of the information processing apparatus 100 include various sensors such as a combination of a gravity sensor and other acceleration sensors.

The cradle detection unit 123 detects whether the connector 201 of the cradle 200 is connected to the cradle connection jack 102. The I/O processing circuit 118 supplies to the CPU 111 a detection result of connection to the connector 201 via the cradle connection jack 102.

Figure 6:
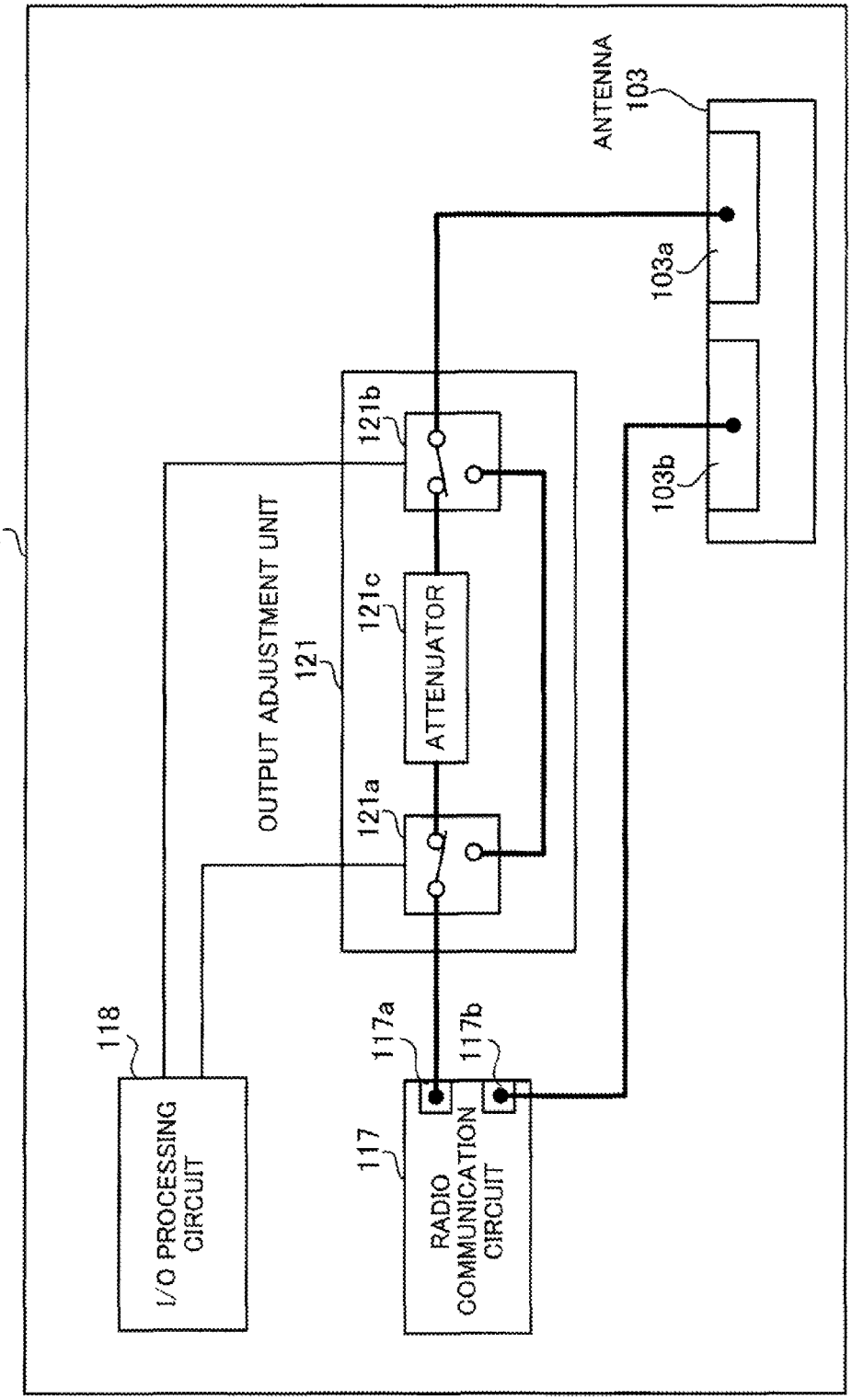
FIG. 6 illustrates a configuration example of an output adjustment unit.

Here, FIG. 6 illustrates a configuration example of the output adjustment unit.

The output adjustment unit 121 has, for example, switches 121a and 121b, and an attenuator 121c. On the other hand, the radio communication circuit 117 has antenna connection terminals 117a and 117b to be connected to connection terminals 103a and 103b of the antenna 103 through connection lines, respectively. In FIG. 6, connection lines between the antenna 103 and the radio communication circuit 117 are illustrated with thick lines.

The output adjustment unit 121 is inserted, for example, between the connection terminal 103a of the antenna 103 and the antenna connection terminal 117a of the radio communication circuit 117. According to a control signal from the I/O processing circuit 118, the switches 121a and 121b switch a route of the connection line between the connection terminal 103a and the antenna connection terminal 117a between a route to go through the attenuator 121c and a route to bypass the attenuator 121c. In the case where the switches 121a and 121b switch to the route to go through the attenuator 121c, the intensity of radio waves radiated from the antenna 103 is reduced as compared with a case of switching to the route to bypass the attenuator 121c. When the bottom surface of the information processing apparatus 100 contacts with a user's body, a resistance value of the attenuator 121c is set so that an influence exerted on the user's body by radio waves radiated from the antenna 103 may satisfy a standard of the SAR.

Suppose that the switches 121a and 121b select the route to go through the attenuator 121c in an initial state (steady state). As a result, for example, in the case where the control of the output adjustment unit 121 is not performed by abnormality generated in the execution of an application program by the CPU 111, the intensity of radio waves radiated from the antenna 103 is reduced by the attenuator 121c.

As a method for changing the intensity of radio waves radiated from the antenna 103, it is not limited to an example of using an attenuator as in FIG. 6 and, for example, a structure in which the intensity of radio waves is changed under the control of the CPU 111 may be provided within the radio communication circuit 117.

Figure 7:
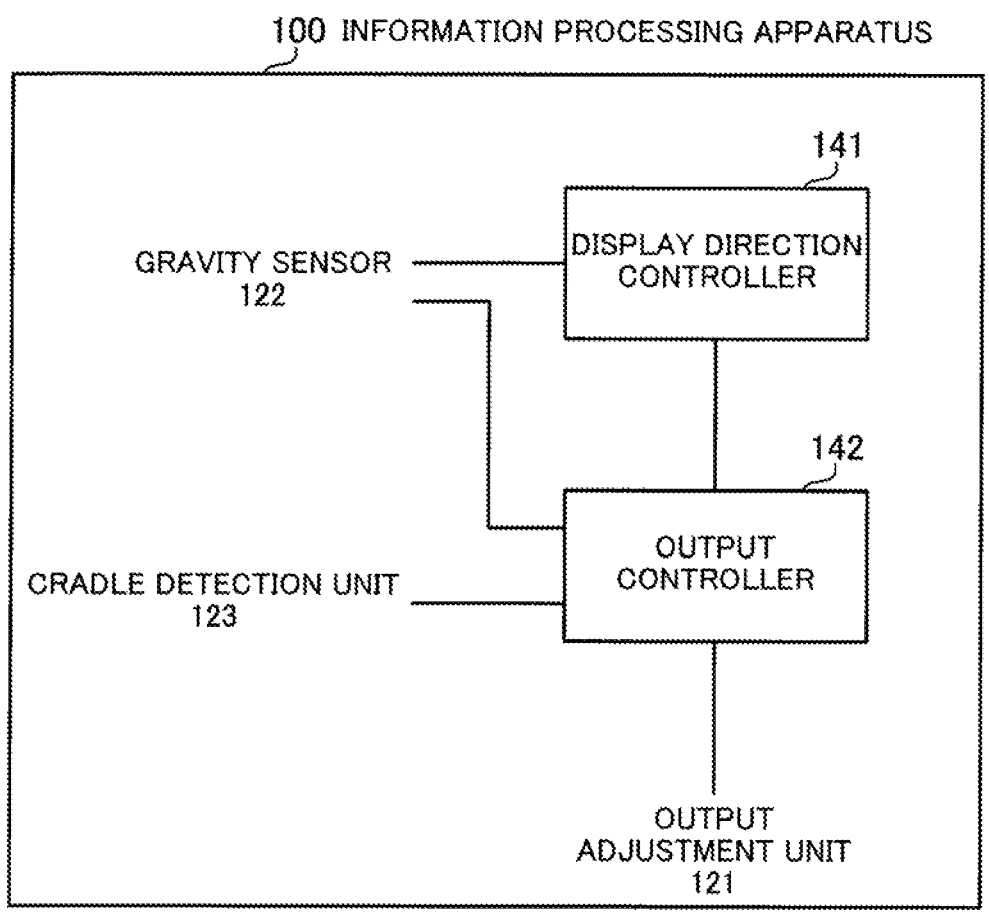
FIG. 7 is a block diagram illustrating an example of processing function included in an information processing apparatus.

Next, FIG. 7 is a block diagram illustrating an example of processing function included in the information processing apparatus.

The information processing apparatus 100 includes a display direction controller 141 and an output controller 142. Each process of the display direction controller 141 and the output controller 142 is performed, for example, by executing a predetermined program through the CPU 111. For example, the process of the display direction controller 141 may be performed by executing the application program, and on the other hand, the process of the output controller 142 may be performed by executing a BIOS (Basic Input/Output System) program. At least a part of each process of the display direction controller 141 and the output controller 142 may be further performed by using an exclusive processing circuit. For example, a part of the process of the display direction controller 141 may be performed by the graphics processing circuit 114.

The display direction controller 141 changes a display direction of images of the display 101 according to tilt detection results of the information processing apparatus 100 from the gravity sensor 122.

The output controller 142 controls a radio wave intensity adjustment operation through the output adjustment unit 121 based on tilt detection results from the gravity sensor 122, a state of the display direction controlled by the display direction controller 141, and detection results of connection to the cradle 200 through the cradle detection unit 123.

Control processing of the display direction through the display direction controller 141 will be here described. First, FIG. 8 illustrates a definition of a direction of the information processing apparatus.

Figure 8:
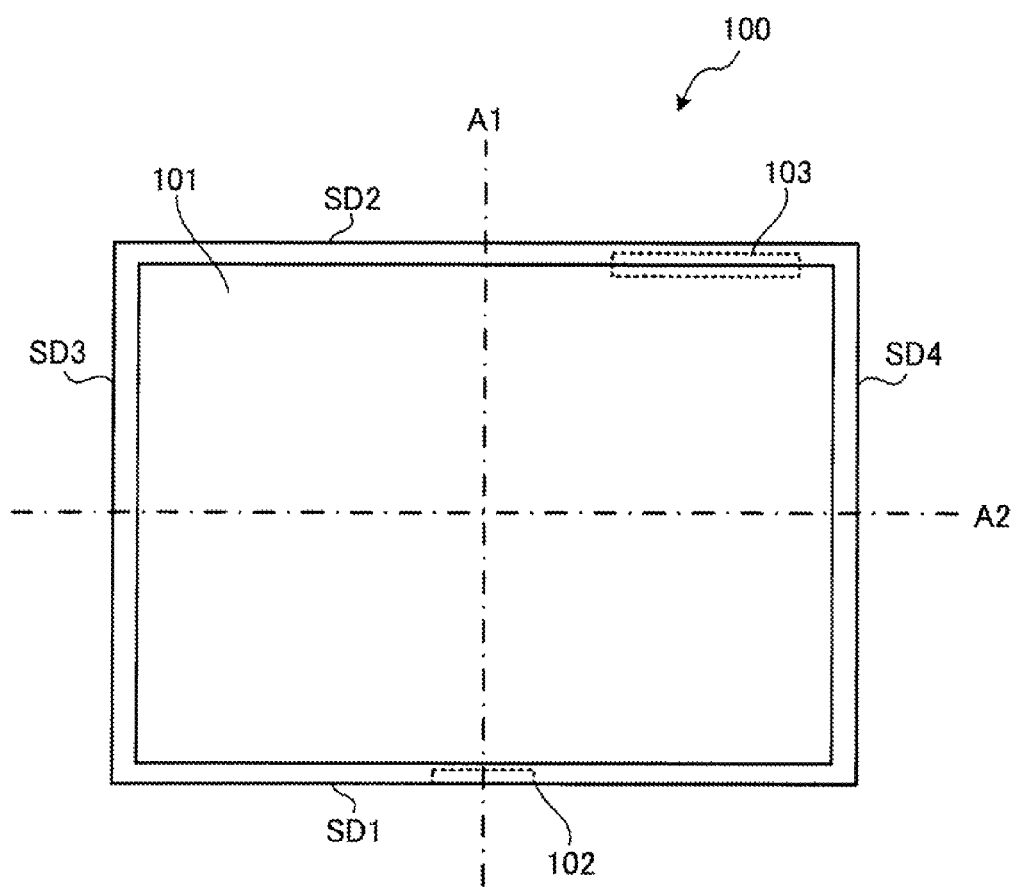
FIG. 8 illustrates a definition of a direction of an information processing apparatus.

FIG. 8 is a diagram obtained by viewing the information processing apparatus 100 from a direction perpendicular to a surface on which the display 101 is mounted. In the following description, among surfaces of the chassis of the information processing apparatus 100, a surface on which the display 101 is mounted is supposed to be called a "display surface", and on the other hand a surface facing to this display surface is supposed to be called a "bottom surface". In the present embodiment, the display surface and the bottom surface are parallel to each other.

Four side surfaces SD1 to SD4 connected to four sides of the display surface are further defined as follows. The side surface SD1 is a side surface on which the cradle connection jack 102 is provided, and the side surface SD2 is a surface facing to the side surface SD1. Accordingly, in a state where the information processing apparatus 100 is connected to the cradle 200, the side surface SD1 is located on the bottom side, and the side surface SD2 is located on the top side as in FIG. 8. In the case where the side surface SD1 is located on the bottom side, the side surface SD3 is located on the left side, and the side surface SD4 is located on the right side. Suppose in the present embodiment that as an example, the antenna 103 for radio communication is located in a position close to the side surface SD2.

Reference axes A1 and A2 for representing a tilt of the information processing apparatus 100 are further defined as follows. Both of the reference axes A1 and A2 are parallel to the display surface and the bottom surface, and perpendicular to each other. When the side surface SD1 is located on the bottom side and the side surface SD2 is located on the top side, the reference axis A1 indicates a vertical direction. When the side surface SD3 is located on the left side and the side surface SD4 is located on the right side, the reference axis A2 indicates a horizontal direction.

When setting as a reference a state where the display surface is directed to the top side, and the display surface and the bottom surface are horizontal, an angle indicating a tilt of the information processing apparatus 100 is defined as follows. In the case where the display surface is directed to the top side, and the display surface and the bottom surface are horizontal, an angle between the reference axis A1 and a horizontal surface is equal to zero degree, and also an angle between the reference axis A2 and a horizontal surface is equal to zero degree.

When the information processing apparatus 100 is turned so that the side surface SD2 may be located on the top side from a state where an angle between the reference axis A1 and the horizontal surface is zero degree, an angle between the reference axis A1 and the horizontal surface changes to a plus direction. On the other hand, when the information processing apparatus 100 is turned so that the side surface SD1 may be located on the top side from a state where an angle between the reference axis A1 and the horizontal surface is zero degree, an angle between the reference axis A1 and the horizontal surface changes to a minus direction.

When the information processing apparatus 100 is turned so that the side surface SD4 may be located on the top side from a state where an angle between the reference axis A2 and the horizontal surface is zero degree, an angle between the reference axis A2 and the horizontal surface changes to a plus direction. On the other hand, when the information processing apparatus 100 is turned so that the side surface SD3 may be located on the top side from a state where an angle between the reference axis A2 and the horizontal surface is zero degree, an angle between the reference axis A2 and the horizontal surface changes to a minus direction.

Figure 9:
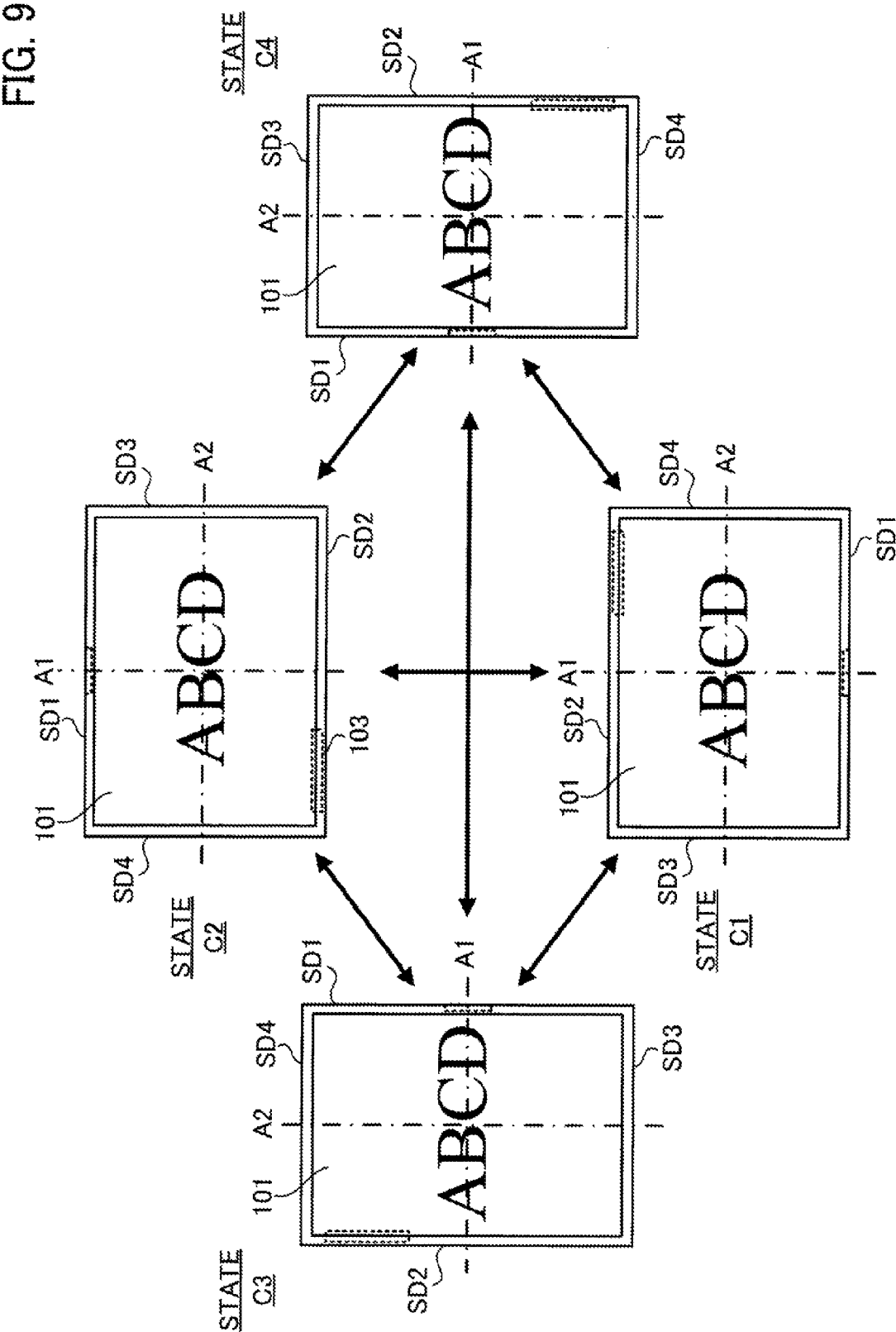
FIG. 9 illustrates a transition example of a display direction of an image in a display.

FIG. 9 illustrates a transition example of the display direction of an image in the display.

The display direction controller 141 controls the display direction of an image in the display 101 to correspond to four states C1 to C4 illustrated in FIG. 9. Based on the tilt detection result through the gravity sensor 122, the display direction controller 141 transits the display direction of an image from each of the four states C1 to C4 to any one of the other three states.

The state C1 indicates a most typical operating state of the information processing apparatus 100. In the state C1, an image is displayed on the display 101 so that the side surface SD1 may be located on the bottom side of the image, the side surface SD2 may be located on the top side of the image, the side surface SD3 may be located on the left side of the image, and the side surface SD4 may be located on the right side of the image.

The state C2 is a state where an image displayed on the display 101 is turned by 180 degrees from the state C1 and displayed. In the state C2, the image is displayed on the display 101 so that the side surface SD2 may be located on the bottom side of the image, the side surface SD1 may be located on the top side of the image, the side surface SD4 may be located on the left side of the image, and the side surface SD3 may be located on the right side of the image.

Suppose, for example, that when an image is displayed as in the state C1, the side surface SD1 side is taken up and an angle between the reference axis A1 and the horizontal surface changes from more than $-\theta th1$ to $-\theta th1$ or less. In this case, the display direction controller 141 changes the display direction of the image as in the state C2. Suppose, for example, that when an image is displayed as in the state C2, the side surface SD2 side is taken up and an angle between the reference axis A1 and the horizontal surface changes to θth1 or more. In this case, the display direction controller 141 changes the display direction of the image as in the state C1.

The state C3 is a state where an image displayed on the display 101 is turned by 90 degrees from the state C1 in a clockwise direction and displayed. In the state C3, the image is displayed on the display 101 so that the side surface SD3 may be located on the bottom side of the image, the side surface SD4 may be located on the top side of the image, the side surface SD2 may be located on the left side of the image, and the side surface SD1 may be located on the right side of the image.

The state C4 is a state where an image displayed on the display 101 is turned by 90 degrees from the state C1 in a counterclockwise direction and displayed. In the state C4, the image is displayed on the display 101 so that the side surface SD4 may be located on the bottom side of the image, the side surface SD3 may be located on the top side of the image, the side surface SD1 may be located on the left side of the image, and the side surface SD2 may be located on the right side of the image.

Suppose, for example, that when an image is displayed as in the state C3, the side surface SD3 side is taken up and an angle between the reference axis A2 and the horizontal surface changes to −θth1 or less. In this case, the display direction controller 141 turns the display direction of the image by 180 degrees as in the state C4. Suppose, for example, that when an image is displayed as in the state C4, the side surface SD4 side is taken up and an angle between the reference axis A2 and the horizontal surface changes to θth1 or more. In this case, the display direction controller 141 turns the display direction of the image by 180 degrees as in the state C3.

Even in any state of the states C1 to C4, a user's body (particularly, a part near an abdomen or groin) is more likely to be located in the vertically downward direction of the image displayed on the display 101. Here, in the state C2, the side surface SD2 is directed to the side of the user's body. In the present embodiment, since the antenna 103 is mounted in a position close to the side surface SD2, the antenna 103 comes close to the user's body in the state C2. To solve the above problem, from the display direction controller 141, the output controller 142 acquires information indicating that the display direction of the image corresponds to any state. When recognizing that the display direction of the image transits to the state C2, the output controller 142 controls the output adjustment unit 121 to reduce the intensity of radio waves radiated from the antenna 103.

Figure 10:
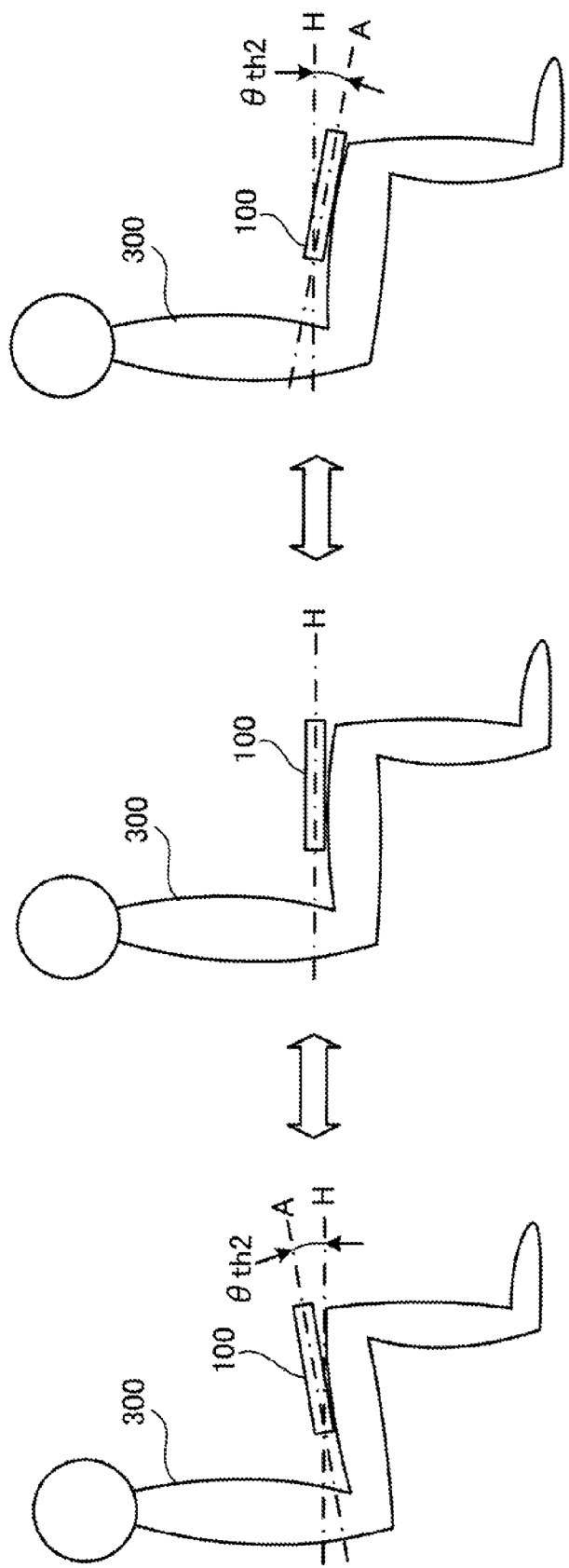
FIG. 10 illustrates an example of an operating state of the case where an information processing apparatus is used on user's legs.

Next, a process of the output controller 142 will be described. FIG. 10 illustrates an example of the operating state of the case where the information processing apparatus is used on user's legs.

The information processing apparatus 100 may be used on seated user 300's knees or thighs (hereinafter, referred to simply as "on legs"). As illustrated in a central diagram of FIG. 10, when the information processing apparatus 100 is used on the user 300's legs, the display surface is directed upward and the bottom surface is horizontal. As can be seen from the above discussion, suppose that the information processing apparatus 100 is used on the user 300's legs. In this case, the antenna 103 mounted on the information processing apparatus 100 comes close to the user 300's legs (knees or thighs) located in the vertically downward direction of the antenna 103. Particularly, as the information processing apparatus 100 is more thinned, the antenna 103 comes closer to the user 300's legs. As a result, the antenna 103 radiates radio waves of higher intensity to the user 300's legs.

To solve the above problem, based on tilt detection results through the gravity sensor 122, the output controller 142 of the information processing apparatus 100 determines that the bottom surface of its own apparatus is horizontal. In this case, the output controller 142 controls the output adjustment unit 121 to reduce the intensity of radio waves radiated from the antenna 103. As a result, even when the information processing apparatus 100 is mounted and used on the user 300's legs, a standard of the SAR is satisfied.

Note that when the information processing apparatus 100 is used on the user 300's legs, the tilt of its own apparatus is not stabilized, and the bottom surface is not necessarily completely horizontal. As illustrated in a left diagram of FIG. 10, for example, the bottom surface may be tilted by certain angles to the horizontal surface H. Among the edges of the information processing apparatus 100, the edge of the front side may be higher than the edge of the near side as viewed from the user 300.

Alternatively, as illustrated in a right diagram of FIG. 10, the bottom surface of the information processing apparatus 100 may be tilted by certain angles to the horizontal surface H. Among the edges of the information processing apparatus 100, the edge of the near side may be higher than the edge of the front side as viewed from the user 300. Note that a reference axis A of FIG. 10 is parallel to the bottom surface, and indicates an axis directed to an anteroposterior direction as viewed from the user 300. For example, when the display direction of the display 101 is set in the state C1 or C2 of FIG. 9, the reference axis A of FIG. 10 corresponds to the reference axis A1 of FIG. 9. Further, when the display direction of the display 101 is set in the state C3 or C4 of FIG. 9, the reference axis A of FIG. 10 corresponds to the reference axis A2 of FIG. 9. Although not illustrated in the figure, among the edges of the information processing apparatus 100, the edge of the left side or right side may be higher than the other edge as viewed from the user 300.

To solve the above problem, when the tilt of the bottom surface of the information processing apparatus 100 is a predetermined angle θth2 or less, the output controller 142 determines that the information processing apparatus 100 is used on the user 300's legs, and reduces the intensity of radio waves radiated from the antenna 103. Suppose, for example, that an absolute value of an angle between the reference axis A1 illustrated in FIG. 9 and the horizontal surface H is θth2 or less and an absolute value of an angle between the reference axis A2 and the horizontal surface H is θth2 or less. In this case, the output controller 142 reduces the intensity of radio waves radiated from the antenna 103. Note, for example, that the θth2 is 15 degrees.

Figure 11:
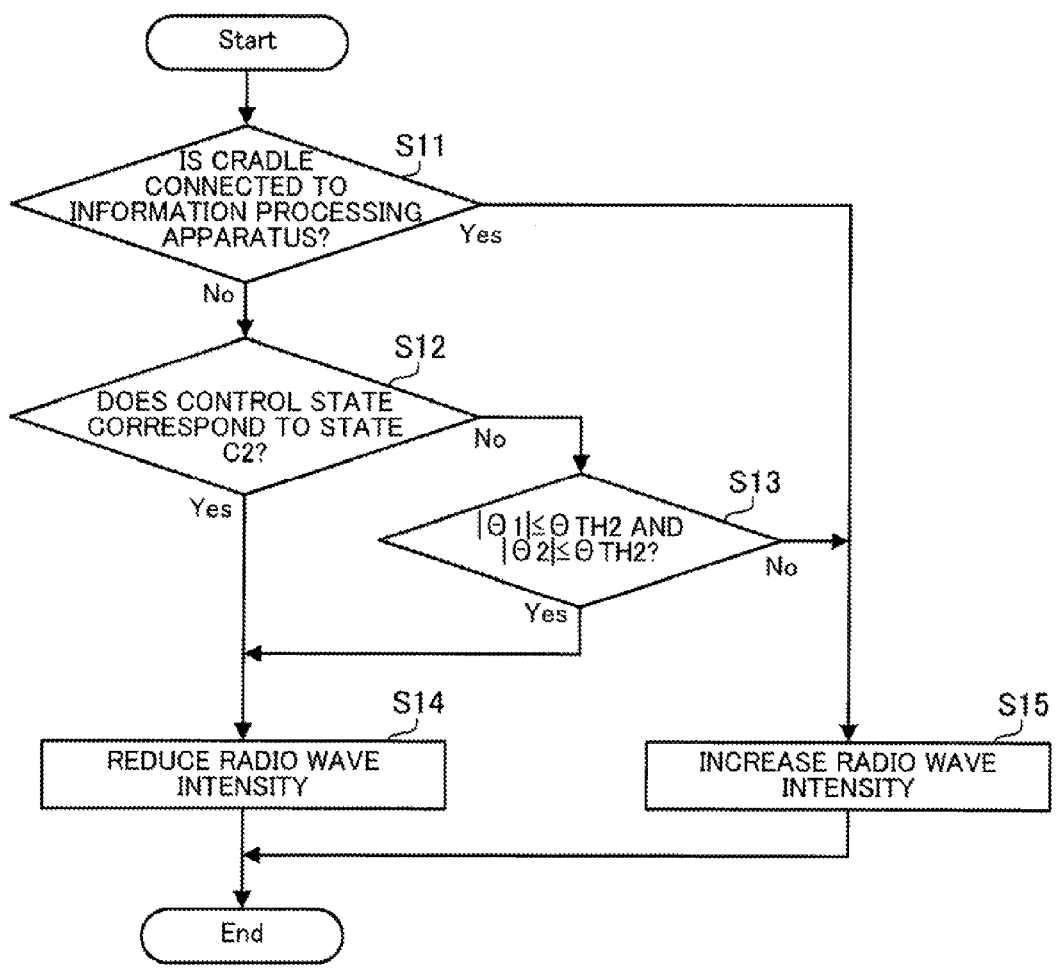
FIG. 11 is a flowchart illustrating an example of a process procedure of an output controller.

FIG. 11 is a flowchart illustrating an example of a process procedure of the output controller. The output controller 142 repeatedly performs a process of FIG. 11 at regular time intervals.

(Step S11) The output controller 142 acquires detection results from the cradle detection unit 123, and determines whether the cradle 200 is connected to the information processing apparatus 100. If so, the output controller 142 performs a process of step S15. On the other hand, if not, the output controller 142 performs a process of step S12.

(Step S12) The output controller 142 acquires a control state of the image display direction from the display direction controller 141. If the control state corresponds to the state C2, the output controller 142 performs a process of step S14. On the other hand, if the control state corresponds to any one of the states C1, C3, and C4, the output controller 142 performs a process of step S13.

(Step S13) From the gravity sensor 122, the output controller 142 acquires an angle $\theta1$ between the reference axis A1 and the horizontal surface H, and an angle $\theta2$ between the reference axis A2 and the horizontal surface H. If an absolute value of the angle $\theta1$ is $\theta th2$ or less and an absolute value of the angle $\theta2$ is $\theta th2$ or less, the output controller 142 performs a process of step S14. On the other hand, if at least one of the absolute values of the angles $\theta1$ and $\theta2$ exceeds the $\theta th2$, the output controller 142 performs a process of step S15.

(Step S14) The output controller 142 controls the output adjustment unit 121 to reduce the intensity of radio waves radiated from the antenna 103. Specifically, the output controller 142 switches the switches 121a and 121b of the output adjustment unit 121 to a route to go through the attenuator 121c.

(Step S15) The output controller 142 controls the output adjustment unit 121 to increase the intensity of radio waves radiated from the antenna 103. Specifically, the output controller 142 switches the switches 121a and 121b of the output adjustment unit 121 to a route to bypass the attenuator 121c.

According to the above-described process of FIG. 11, when the information processing apparatus 100 is connected to the cradle 200, the output controller 142 controls the output adjustment unit 121 to increase the intensity of radio waves radiated from the antenna 103. When the information processing apparatus 100 is connected to the cradle 200, the display surface of its own apparatus is brought into an erected state. In this state, even if the intensity of radio waves radiated from the antenna 103 is not reduced, the antenna 103 is separated from the user's body so as to sufficiently satisfy a standard of the SAR. Therefore, the output controller 142 controls the output adjustment unit 121 not to reduce the intensity of radio waves radiated from the antenna 103 through the attenuator 121c.

When the information processing apparatus 100 is not connected to the cradle 200 and the control state of the display direction of an image corresponds to the state C2, the output controller 142 controls the output adjustment unit 121 to reduce the intensity of radio waves radiated from the antenna 103. As illustrated in FIG. 9, in the state C2, the side surface SD2 of the chassis of the information processing apparatus 100 is normally directed to a direction of the user's body (particularly, a part near an abdomen or groin). The antenna 103 is disposed in a portion close to the side surface SD2, and therefore comes close to a part near a user's abdomen or groin in the state C2. Consequently, in the case where the control state of the display direction of an image corresponds to the state C2, regardless of whether the bottom surface of the information processing apparatus 100 is approximately horizontal, the intensity of radio waves radiated from the antenna 103 is reduced so as to satisfy a standard of the SAR.

Suppose further that the output controller 142 determines that the information processing apparatus 100 is not connected to the cradle 200 and the control state of the display direction of an image fails to correspond to the state C2. In this case, the output controller 142 performs a process of step S13 and determines whether the bottom surface of the information processing apparatus 100 is approximately horizontal. When determining, based on the process of step S13, that the bottom surface is approximately horizontal, the output controller 142 controls the output adjustment unit 121 to reduce the intensity of radio waves radiated from the antenna 103.

As a result, the output controller 142 controls the output adjustment unit 121 to reduce the intensity of radio waves radiated to the user's body located in the vertically downward direction of the information processing apparatus 100. Accordingly, even when the information processing apparatus 100 is mounted and used on the seated user's legs, the output controller 142 controls the output adjustment unit 121 to suppress an influence exerted on the user's legs by radiated waves so as to satisfy a standard of the SAR. While satisfying the standard of the SAR, the present embodiment further thins the chassis of the information processing apparatus 100. The present embodiment further improves a degree of freedom in a position of the antenna 103 of the chassis of the information processing apparatus 100.

When the information processing apparatus has change function of the display direction of an image as illustrated in FIG. 9, most of them have a mechanism for detecting a tilt. The above-described information processing apparatus 100 uses the tilt detection mechanism in both of the determination processing of the image display direction and the determination processing of whether the bottom surface is approximately horizontal. Accordingly, the manufacturing cost is prevented from increasing.

Examples of other methods for detecting that a user's body comes close to the bottom surface of the information processing apparatus 100 include a method for using an electrostatic sensor, a method for using an illumination sensor, and a method for using a light emitting unit and illumination sensor of infrared rays.

An electrostatic sensor detects, based on a change in electrostatic capacity, that a user's body comes close to the bottom surface of the information processing apparatus. In the case of using an electrostatic sensor, when the user's body contacts with or comes close to the bottom surface before turning on power, the output controller 142 fails to determine, after turning on power, whether the user's body contacts with or comes close to the bottom surface. As compared with the above, as in the present embodiment, the user's body is supposed to contact with or come close to the bottom surface before turning on power by using a method for detecting, based on tilt detection results of the bottom surface, that the user's body comes close to the bottom surface in the vertically downward direction of the information processing apparatus 100. Also in this case, the output controller 142 correctly determines, after turning on power, that the user's body comes close to the bottom surface.

In the case of a method for using an illumination sensor, when an intake of light is provided on a bottom surface of the information processing apparatus and intensity of light thrown from the intake is detected by the illumination sensor, the information processing apparatus detects that the user's body contacts with or comes close to the bottom surface. In this method, when the environment is dark, the detection fails to be correctly performed. As compared with the above, based on tilt detection results of the bottom surface, these features of the present embodiment permit the information processing apparatus 100 to detect that the user's body comes close to the bottom surface in the vertically downward direction of its own apparatus, and determine that the user's body comes close to the bottom surface irrespective of peripheral brightness.

In the case of a method for using a light emitting unit and an illumination sensor, when light is irradiated outward from a bottom surface to detect its reflected light by the illumination sensor, the information processing apparatus detects that a user's body contacts with or comes close to the bottom surface. In this method, the information processing apparatus may fail to detect that the user's body contacts with the bottom surface for the reason of failing to acquire a light path, or the user's body comes close to the bottom surface depending on a color of the surface on which light is irradiated. As compared with the above, based on tilt detection results of the bottom surface, these features of the present embodiment permit the information processing apparatus 100 to detect that the user's body comes close to the bottom surface in the vertically downward direction of its own apparatus, and as a result, the above-described problem is not caused.

Next, FIGS. 12 to 15 illustrate a relationship among the tilt of the information processing apparatus, the display direction of an image, and the intensity of radio waves.

FIGS. 12 to 15 illustrate operation examples of the case where the user uses the information processing apparatus 100 so that the display 101 may be horizontally long (specifically, so that the control state of the image display direction may correspond to the state C1 or C2). Suppose, for example, that in FIGS. 12 to 15, the information processing apparatus 100 is mounted and used on the seated user's legs. Further, in FIGS. 12 to 15, the information processing apparatus 100 is supposed to be held so that the reference axis A2 may be approximately horizontal, and the information processing apparatus 100 is supposed to be turned at the center of the reference axis A2. In this case, the angle θ1 between the reference axis A1 and the horizontal surface H varies.

FIGS. 12 and 13 illustrate an example of the case where a threshold θth1 of the tilt for determining whether the display direction of an image is changed is larger than a threshold θth2 of the tilt for determining whether the bottom surface is approximately horizontal. Here, suppose, as one example, that the θth1 is 30 degrees and the θth2 is 15 degrees.

FIG. 12 illustrates an example of the case where the tilt of the information processing apparatus 100 changes based on an operating state that the control state of the image display direction corresponds to the state C1. In this case, when the side surface SD2 of the front side viewed from the user is turned upward among the side surfaces of the information processing apparatus 100, the θ1 detected by the gravity sensor 122 changes in a plus direction.

Even if the θ1 changes from zero degree in the plus direction, the control state of the image display direction will not change from the state C1. When the θ1 changes from zero degree to 15 degrees, since the conditions of step S13 of FIG. 11 are satisfied, the intensity of radio waves radiated from the antenna 103 remains to be a weak state. When the θ1 exceeds 15 degrees, the conditions of step S13 are not satisfied. Therefore, the output controller 142 determines that the bottom surface is not horizontal, and controls the output adjustment unit 121 to increase the intensity of radio waves radiated from the antenna 103.

On the other hand, when the side surface SD1 of the near side viewed from the user is turned upward among the side surfaces of the information processing apparatus 100, the θ1 detected by the gravity sensor 122 changes in a minus direction. Even if the θ1 changes from zero degree to −15 degrees, the control state of the image display direction will not change from the state C1. Since the conditions of step S13 of FIG. 11 are satisfied, the intensity of radio waves radiated from the antenna 103 remains to be a weak state. When the θ1 becomes lower than −15 degrees, the conditions of step S13 are not satisfied. Therefore, the output controller 142 determines that the bottom surface is not horizontal, and controls the output adjustment unit 121 to increase the intensity of radio waves radiated from the antenna 103. However, when the θ1 becomes lower than −30 degrees, the control state of the image display direction changes into the state C2. At this time, the output controller 142 controls the output adjustment unit 121 to reduce the intensity of radio waves radiated from the antenna 103 again. Even when the user comes close to the side surface SD2, strong radio waves are prevented from being radiated to this user.

FIG. 13 illustrates an example of the case where the tilt of the information processing apparatus 100 changes based on an operating state that the control state of the image display direction corresponds to the state C2. In this case, when the side surface SD1 of the front side viewed from the user is turned upward among the side surfaces of the information processing apparatus 100, the θ1 detected by the gravity sensor 122 changes in a minus direction. Even if the θ1 changes from zero degree in the minus direction, the control state of the image display direction will not change from the state C2. In the user's body, particularly, a groin part is estimated to remain to come close to the antenna 103. Therefore, even if the θ1 becomes from zero degree to lower than −30 degrees, the intensity of radio waves radiated from the antenna 103 remains to be a weak state irrespective of the determination result of step S13.

On the other hand, when the side surface SD2 of the near side viewed from the user is turned upward among the side surfaces of the information processing apparatus 100, the θ1 detected by the gravity sensor 122 changes in a plus direction. When the θ1 changes from zero degree to 30 degrees, the control state of the image display direction will not change from the state C2. Therefore, the intensity of radio waves radiated from the antenna 103 remains to be a weak state irrespective of the determination result of step S13. However, when the θ1 exceeds 30 degrees, the control state of the image display direction changes into the state C1. At this time, since the user's groin part is estimated to be separated from the antenna 103, the output controller 142 controls the output adjustment unit 121 to increase the intensity of radio waves radiated from the antenna 103.

FIGS. 14 and 15 illustrate an example of the case where a threshold θth1 of the tilt for determining whether the display direction of an image is changed is equal to or smaller than a threshold θth2 of the tilt for determining whether the bottom surface is approximately horizontal. Here, suppose, as one example, that both of the θth1 and the θth2 are 15 degrees.

FIG. 14 illustrates an example of the case where the tilt of the information processing apparatus 100 changes based on an operating state that the control state of the image display direction corresponds to the state C1. In this case, when the side surface SD2 of the front side viewed from the user is turned upward among the side surfaces of the information processing apparatus 100, the θ1 detected by the gravity sensor 122 changes in a plus direction. Even if the θ1 changes from zero degree in the plus direction, the control state of the image display direction will not change from the state C1. When the θ1 changes from zero degree to 15 degrees, the conditions of step S13 are not satisfied. Therefore, the output controller 142 determines that the bottom surface is not horizontal, and controls the output adjustment unit 121 to increase the intensity of radio waves radiated from the antenna 103.

On the other hand, when the side surface SD1 of the near side viewed from the user is turned upward among the side surfaces of the information processing apparatus 100, the θ1 detected by the gravity sensor 122 changes in a minus direction. Even if the θ1 changes from zero degree to −15 degrees, the control state of the image display direction will not change from the state C1. Since the conditions of step S13 of FIG. 11 are satisfied, the intensity of radio waves radiated from the antenna 103 remains to be a weak state. When the θ1 becomes lower than −15 degrees, the control state of the image display direction changes into the state C2, and at the same time, the conditions of step S13 are not satisfied. Therefore, the output controller 142 controls the output adjustment unit 121 to increase the intensity of radio waves radiated from the antenna 103.

FIG. 15 illustrates an example of the case where the tilt of the information processing apparatus 100 changes based on an operating state that the control state of the image display direction corresponds to the state C2. In this case, when the side surface SD1 of the front side viewed from the user is turned upward among the side surfaces of the information processing apparatus 100, the θ1 detected by the gravity sensor 122 changes in a minus direction. Even if the θ1 changes from zero degree in the minus direction, the control state of the image display direction will not change from the state C2. The user's groin part is estimated to remain to come close to the antenna 103. Therefore, even if the θ1 becomes from zero degree to lower than −30 degrees, the intensity of radio waves radiated from the antenna 103 remains to be a weak state irrespective of the determination result of step S13.

On the other hand, when the side surface SD2 of the near side viewed from the user is turned upward among the side surfaces of the information processing apparatus 100, the θ1 detected by the gravity sensor 122 changes in a plus direction. When the θ1 changes from zero degree to 15 degrees, the control state of the image display direction will not change from the state C2. Since the conditions of step S13 are satisfied, the intensity of radio waves radiated from the antenna 103 remains to be a weak state. When the θ1 exceeds 15 degrees, the control state of the image display direction changes into the state C1, and at the same time the conditions of step S13 are not satisfied. Therefore, the output controller 142 controls the output adjustment unit 121 to increase the intensity of radio waves radiated from the antenna 103. Suppose that the control state of the image display direction corresponds to the state C2, and the θth1 is equal to or smaller than the θth2. In this case, if the θ1 is equal to or higher than zero degree, the output controller 142 controls the intensity of radio waves based on only a change in the display direction irrespective of the determination result of step S13.

Note that each of the θth1 and the θth2 changes according to a setting operation of the user.

Processing function of the above-described information processing apparatus 1 and 100 according to the present embodiments can be performed by a computer. In that case, there is provided a program having described therein processing contents of function with which each of the apparatus should be provided. When the program is executed by a computer, the above-described processing function is performed by a computer. The program having described therein the processing contents is recorded in a computer-readable recording medium. Examples of the computer-readable recording medium include a magnetic recording system, an optical disk, a magneto-optical recording medium, and a semiconductor memory. Examples of the magnetic recording system include an HDD (Hard Disk Drive), an FD (Floppy Disk), and a magnetic tape. Examples of the optical disk include a DVD (Digital Versatile Disk), a DVD-RAM, a CD-ROM (Compact Disk Read Only Memory), and a CD-R (Recordable)/RW (ReWritable). Examples of the magneto-optical recording medium include an MO (Magneto-Optical disk).

In the case of distribution of programs, portable recording media, such as DVD and CD-ROM with the recorded programs are sold. Also, programs are stored in a storage device of a server computer, and the programs are transferred to other computers from the server computer via a network.

The computer which executes the program stores, for example, a program recorded in a portable recording medium or a program transferred from the server computer in the storage device of the computer. The computer then reads out the program from the storage device of the computer, and executes processings according to the program. The computer may directly read out the program from the portable recording medium to execute the processings according to the program. The computer may also sequentially execute processings according to a received program every time the program is transferred from the server computer connected via a network.

As can be seen from various embodiments discussed above, the proposed information processing apparatus and radio wave intensity control method reduce a radiant quantity of radio waves to a human body coming close to a vertically downward direction of its own apparatus.

Further, the proposed program reduces a radiant quantity of radio waves to a human body coming close to a vertically downward direction of a computer.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that various changes, substitutions, and alterations could be made hereto without departing from the spirit and scope of the invention.

What is claimed is:

1. An information processing apparatus having radio communication function, comprising:
 a tilt detector configured to detect a tilt of the information processing apparatus;
 an output changer configured to change an output of radio waves from an antenna for radio communication; and
 an output controller configured to reduce an output of radio waves from the antenna to a predetermined value or less with respect to the output changer when it is determined based on a detection result obtained by the tilt detector that a tilt of a predetermined external surface of a chassis of the information processing apparatus to a horizontal surface is a predetermined angle or less.

2. The information processing apparatus according to claim 1, wherein when tilts of straight lines in all directions along the predetermined external surface to the horizontal surface are the predetermined angle or less, the output controller reduces an output of radio waves from the antenna to the predetermined value or less.

3. The information processing apparatus according to claim 1, wherein:
 a display device to display an image is mounted on one surface of the chassis; and
 the predetermined external surface is a surface facing to the external surface on which the display device is mounted among external surfaces of the chassis.

4. A radio wave intensity control method executed by an information processing apparatus having radio communication function, the method comprising:
 determining whether a tilt of a predetermined external surface of a chassis of the information processing apparatus to a horizontal surface is a predetermined angle or less; and reducing to a predetermined value or less an output of radio waves from an antenna for radio communication included in the information processing apparatus when the tilt of the predetermined external surface to the horizontal surface is the predetermined angle or less.

5. The radio wave intensity control method according to claim 4, wherein in controlling the output of radio waves from the antenna, when tilts of straight lines in all directions along the predetermined external surface to the horizontal surface are the predetermined angle or less, the output of radio waves from the antenna is reduced to the predetermined value or less.

6. The radio wave intensity control method according to claim 4, wherein:
   a display device to display an image is mounted on one surface of the chassis; and
   the predetermined external surface is a surface facing to the external surface on which the display device is mounted among external surfaces of the chassis.

7. A computer-readable, non-transitory medium encoded with a computer program, the computer program causing a computer having radio communication function to perform a procedure comprising:
   determining whether a tilt of a predetermined external surface of a chassis of the computer to a horizontal surface is a predetermined angle or less; and
   reducing to a predetermined value or less an output of radio waves from an antenna for radio communication included in the computer when the tilt of the predetermined external surface to the horizontal surface is the predetermined angle or less.

8. The computer-readable, non-transitory medium according to claim 7, wherein in controlling the output of radio waves from the antenna, when tilts of straight lines in all directions along the predetermined external surface to the horizontal surface are the predetermined angle or less, the output of radio waves from the antenna is reduced to the predetermined value or less.

9. The computer-readable, non-transitory medium according to claim 7, wherein:
   a display device to display an image is mounted on one surface of the chassis; and
   the predetermined external surface is a surface facing to the external surface on which the display device is mounted among external surfaces of the chassis.

* * * * *